United States Patent
Lin et al.

(10) Patent No.: US 9,870,190 B2
(45) Date of Patent: Jan. 16, 2018

(54) FLOATING IMAGE DISPLAY APPARATUS

(71) Applicant: Chunghwa Picture Tubes, LTD., Taoyuan (TW)

(72) Inventors: Hsiang-Tan Lin, Keelung (TW); Pei-Lin Hsieh, Taoyuan (TW); Hsu Yang, Keelung (TW); Chien-Hung Chen, New Taipei (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 67 days.

(21) Appl. No.: 14/936,330

(22) Filed: Nov. 9, 2015

(65) Prior Publication Data

US 2017/0060513 A1 Mar. 2, 2017

(30) Foreign Application Priority Data

Aug. 25, 2015 (CN) .......................... 2015 1 0526242

(51) Int. Cl.
*G06F 3/14* (2006.01)
*G06F 9/00* (2006.01)

(52) U.S. Cl.
CPC .............. *G06F 3/1423* (2013.01); *G06F 9/00* (2013.01); *G09G 2300/0456* (2013.01); *G09G 2320/028* (2013.01); *G09G 2320/0261* (2013.01)

(58) Field of Classification Search
CPC ................ G02B 5/136; G02B 27/2292; H04N 13/0402; H04N 13/04; G06F 3/1423; G06F 9/00
See application file for complete search history.

(56) References Cited

U.S. PATENT DOCUMENTS

| 8,434,872 B2 | 5/2013 | Maekawa |
| 2010/0195055 A1* | 8/2010 | Maekawa .......... G02B 27/2292 353/10 |

(Continued)

FOREIGN PATENT DOCUMENTS

| CN | 101124507 | 2/2008 |
| CN | 102109750 | 6/2011 |

(Continued)

OTHER PUBLICATIONS

"Office Action of Taiwan Counterpart Application", dated Dec. 1, 2016, p. 1-p. 5.

(Continued)

*Primary Examiner* — Benjamin C Lee
*Assistant Examiner* — Robert Michaud
(74) *Attorney, Agent, or Firm* — J.C. Patents

(57) ABSTRACT

A floating image display apparatus including a plurality of display modules, a first directional film, and at least one transflective element is provided. The display modules include a first display module and a second display module. The first display module includes a first and a second display panel. The second display module is located on an opposite side to the first display module and includes a third and a fourth display panel. The third display panel is disposed corresponding to the first display panel and the fourth display panel is disposed corresponding to the second display panel. The first directional film is disposed on the first display module and is located between the first and second display modules. The transflective element is located between the first and second display modules, and each of the transflective element and the second display module form an included angle θ1.

10 Claims, 5 Drawing Sheets

(56) References Cited

U.S. PATENT DOCUMENTS

2012/0236269 A1* 9/2012 Yoneno .............. H04N 13/0402
                                                        353/99
2014/0198362 A1    7/2014 Tseng et al.

FOREIGN PATENT DOCUMENTS

| CN | 102314068 | 1/2012 |
| CN | 102636836 | 8/2012 |
| CN | 202512366 | 10/2012 |
| CN | 103941410 | 7/2014 |
| JP | H11249071 | 9/1999 |
| TW | 201213854 | 4/2012 |
| TW | 201307896 | 2/2013 |

OTHER PUBLICATIONS

"Office Action of China Counterpart Application," dated Oct. 27, 2017, pp. 1-6, in which the listed references were cited.

* cited by examiner

FLOATING IMAGE DISPLAY APPARATUS

CROSS-REFERENCE TO RELATED APPLICATION

This application claims the priority benefit of China application serial no. 201510526242.9, filed on Aug. 25, 2015. The entirety of the above-mentioned patent application is hereby incorporated by reference herein and made a part of this specification.

BACKGROUND OF THE INVENTION

Field of the Invention

The invention relates to a floating image display apparatus and more particularly relates to a floating image display apparatus having a directional film and a plurality of transflective elements.

Description of Related Art

The continuous rapid changes of science and technology indicate that the display techniques are also continuously improved. In recent years, apparatuses that can project floating images are also proposed. A conventional floating image display apparatus includes an upper display screen matched with a piece of transflective element, such that an image displayed by the upper display screen can be reflected by the transflective element, thereby allowing a user to see a floating image.

However, the conventional floating image display apparatus has many limitations in terms of viewing angles and placement. For example, the conventional floating image display apparatus only presents a floating image with a single depth, and the user can only view the floating image from a single direction. Furthermore, if viewing upward from below, the user may see the image displayed by the upper layer display directly, interfering with the floating image effect. In other words, the conventional floating image display apparatus can only be placed upright; otherwise, the user would directly see the image displayed by the upper layer display.

SUMMARY OF THE INVENTION

The invention provides a floating image display apparatus, which provides images having a multi-layered effect in a plurality of directions, and reduces an issue of visual confusion caused by directly seeing the image displayed on the display apparatus from specific directions.

The invention provides a floating image display apparatus including a plurality of display modules, a first directional film, and at least one transflective element. The plurality of display modules include a first display module and a second display module. The first display module includes a first display panel and a second display panel. The second display module is located on an opposite side to the first display module and includes a third display panel and a fourth display panel. The third display panel is disposed corresponding to the first display panel, and the fourth display panel is disposed corresponding to the second display panel. The first directional film is disposed on the first display module and is located between the first display module and the second display module. The transflective element is located between the first display module and the second display module, and each of the transflective element and the second display module form an included angle $\theta 1$.

In an embodiment of the invention, the first display panel and the second display panel display different images, and the third display panel and the fourth display panel display different images.

In an embodiment of the invention, the floating image display apparatus further includes a second directional film, disposed on the second display module and located between the second display module and the first display module.

In an embodiment of the invention, the first display panel and the second display panel are formed integrally, and the third display panel and the fourth display panel are formed integrally.

In an embodiment of the invention, the first display panel and the second display panel are separated from each other, and the third display panel and the fourth display panel are separated from each other.

In an embodiment of the invention, the plurality of display modules further include a third display module, disposed between the third display panel and the fourth display panel, and the third display module includes a fifth display panel.

In an embodiment of the invention, light exiting directions of the first display module and the second display module and a light exiting direction of the third display module have an included angle $\alpha 1$, and $0° \leq \alpha 1 \leq 90°$.

In an embodiment of the invention, the plurality of display modules further include a fourth display module, a fifth display module, a third directional film, and a fourth directional film. The fourth display module includes a sixth display panel and a seventh display panel, and a light exiting direction of the fourth display module and the light exiting direction of the third display module have an included angle $\alpha 2$, and $0° \leq \alpha 2 \leq 90°$. The fifth display module is located on an opposite side to the fourth display module and includes an eighth display panel and a ninth display panel. The eighth display panel is disposed corresponding to the sixth display panel, the ninth display panel is disposed corresponding to the seventh display panel, and a light exiting direction of the fifth display module and the light exiting direction of the third display module have an included angle $\alpha 3$, and $0 \leq \alpha 3 \leq 90°$. The third directional film is disposed on the fourth display module and is located between the fourth display module and the fifth display module. The fourth directional film is disposed on the fifth display module and is located between the fifth display module and the fourth display module. The transflective element is located between the fourth display module and the fifth display module.

In an embodiment of the invention, the transflective element is a planar structure.

In an embodiment of the invention, the transflective element is a curved structure.

Accordingly, by coordinating the plurality of display panels and the plurality of transflective elements, the floating image display apparatus of the invention presents multi-directional images, such that users may view different images from different viewing angles. Furthermore, since the transmission path of the image light beam of each of the display panels is different, the images viewed by the users may present a multi-layered effect. In another aspect, by disposing the directional films on the display modules, the issue of visual confusion caused by the users directly seeing the image on the display panels in specific directions is reduced, such that the floating image display apparatus can be arbitrarily designed to be placed vertically or horizontally to achieve optimal effects corresponding to different occasions of application.

DESCRIPTION OF THE EMBODIMENTS

Figure 1A:
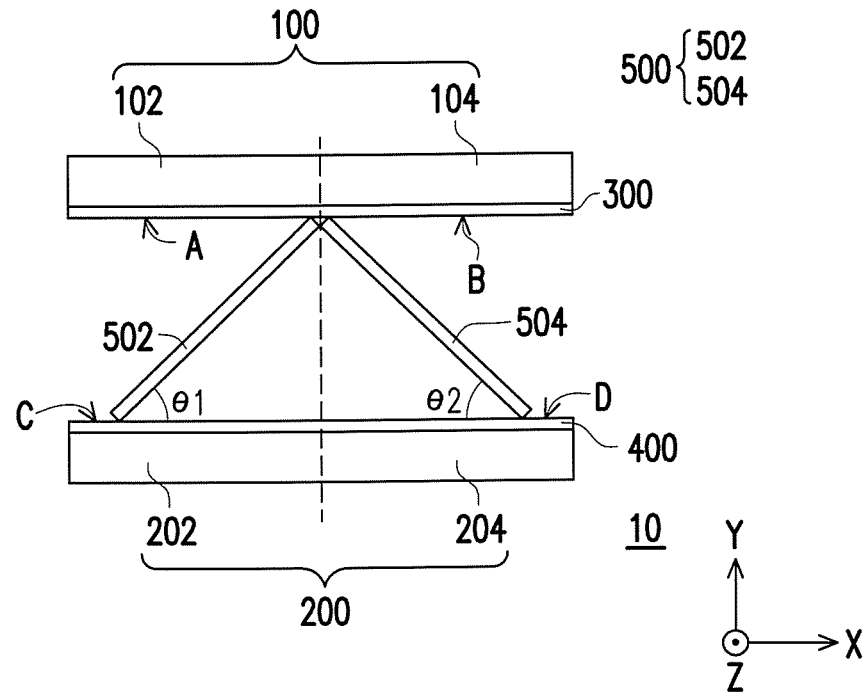
FIG. 1A is a schematic diagram of a side view of a floating image display apparatus according to an embodiment of the invention.

Referring to FIG. 1A, a floating image display apparatus 10 includes a first display module 100, a second display module 200, a first directional film 300, a second directional film 400, and a transflective element module 500. The first display module 100 includes a first display panel 102 and a second display panel 104. In the present embodiment, the first display panel 102 and the second display panel 104 are, for example, connected and formed integrally, but the invention is not limited thereto. In other embodiments that will be discussed later, the first display panel 102 and the second display panel 104 can also be separated from each other. Similarly, the second display module 200 includes a third display panel 202 and a fourth display panel 204, and the third display panel 202 and the fourth display panel 204 are connected and formed integrally. The first display panel 102 faces the third display panel 202, and the second display panel 104 faces the fourth display panel 204. The first display panel 102 displays a first display image A, and the second display panel 104 displays a second display image B. In another aspect, the third display panel 202 displays a third display image C, and the fourth display panel 204 displays a fourth display image D. In other words, in the present embodiment, all of the display panels display different display images, but the invention is not limited thereto. In other embodiments, each display panel can display the same or different display images at the same time. It is worth noting that in the present embodiment, the display images of all of the display panels are on the XZ-plane. The display panels in the invention include a liquid crystal display (LCD), an organic electroluminescence display (OEL display), a plasma display panel (PDP), a digital light processing (DLP) or other types of display panels, and the invention does not limit the type of display panels.

The first directional film 300 is disposed on the first display module 100 and is located between the first display module 100 and the second display module 200. The second directional film 400 is disposed on the second display module 200 and is also located between the first display module 100 and the second display module 200. In other words, the first directional film 300 and the second directional film 400 are disposed on different display modules. More specifically, the first directional film 300 is, for example, disposed on a surface of the first display panel 102 and the second display panel 104, and the second directional film 400 is, for example, disposed on a surface of the third display panel 202 and the fourth display panel 204. In the present embodiment, the first directional film 300 and the second directional film 400 focus light in a single direction or only allows a single direction of light to pass. That is, the first directional film 300 and the second directional film 400 allow light emitted from the first display panel 102, the second display panel 104, the third display panel 202, and the fourth display panel 204 to only transmit in a specific direction. For example, the first directional film 300 and the second directional film 400 include a display privacy filter, an automobile thermal insulation paper, or a directional optical film, but the invention is not limited thereto. A material able to focus light in a single direction or only allows a single direction of light to pass can all serve as the first directional film 300 and the second directional film 400 in the invention.

The transflective element module 500 is disposed between the first display module 100 and second display module 200, and includes at least one transflective element. In the present embodiment, the transflective element module 500, for example, includes a first transflective element 502 and a second transflective element 504. Material of the transflective element module 500 includes glass, film, acrylic or other transflective materials, and the invention does not limit the material of the transflective element module 500. The first transflective element 502 is disposed corresponding to the first display panel 102 and the third display panel 202, and second transflective element 504 is disposed corresponding to the second display panel 104 and the fourth display panel 204. More specifically, the first transflective element 502 is located between the first display panel 102 and the third display panel 202, and for example, is in direct contact with the first display panel 102 and the third display panel 202. However, in other embodiments, the first transflective element 502 may not be in direct contact with the first display panel 102 or the third display panel 202. The first transflective element 502 and the third display panel 202 of the second display module 200, for example, form a first included angle $\theta1$, and $0°<\theta1<90°$. In other words, the first transflective element 502 is inclinedly placed between the first display panel 102 and the third display panel 202, as shown in FIG. 1A. Similarly, the second transflective element 504 is located between the second display panel 104 and the fourth display panel 204, and for example, is in direct contact with the second display panel 104 and the fourth display panel 204. However, in other embodiments, the second transflective element 504 may not be in direct contact with the second display panel 104 or the fourth display panel 204. The second transflective element 504 and the fourth display panel 204 of the second display module 200, for example, form a second included angle $\theta2$, and $0°<\theta2<90°$. In other words, the second transflective element 504 is inclinedly placed between the second display panel 104 and the fourth display panel 204. The figures corresponding to the present embodiment is illustrated based on the first included angle $\theta1$ being equal to the second included angle $\theta2$, but the invention is not limited thereto. In other embodiments, the first included angle $\theta1$ can also not be equal to the second included angle $\theta2$. That is, the degree of inclination of the first transflective element 502 and the second transflective element 504 can be different. Furthermore, the first transflective element 502 and the second transflective element 504 in the present embodiment are respectively inclined from the outside toward the inside to form an isosceles triangle with the second display module 200 as an example, but the invention is not limited thereto. In other embodiments, the first transflective element 502 and the second transflective element 504 can also be disposed to incline from the inside toward the outside to form an inverted triangle structure. It is worth noting that in the present embodiment, the transflective element module 500 is a planar structure as an example, but the invention is not limited thereto. In other embodiments, the transflective element module 500 can also be a curved structure.

Figure 1B:
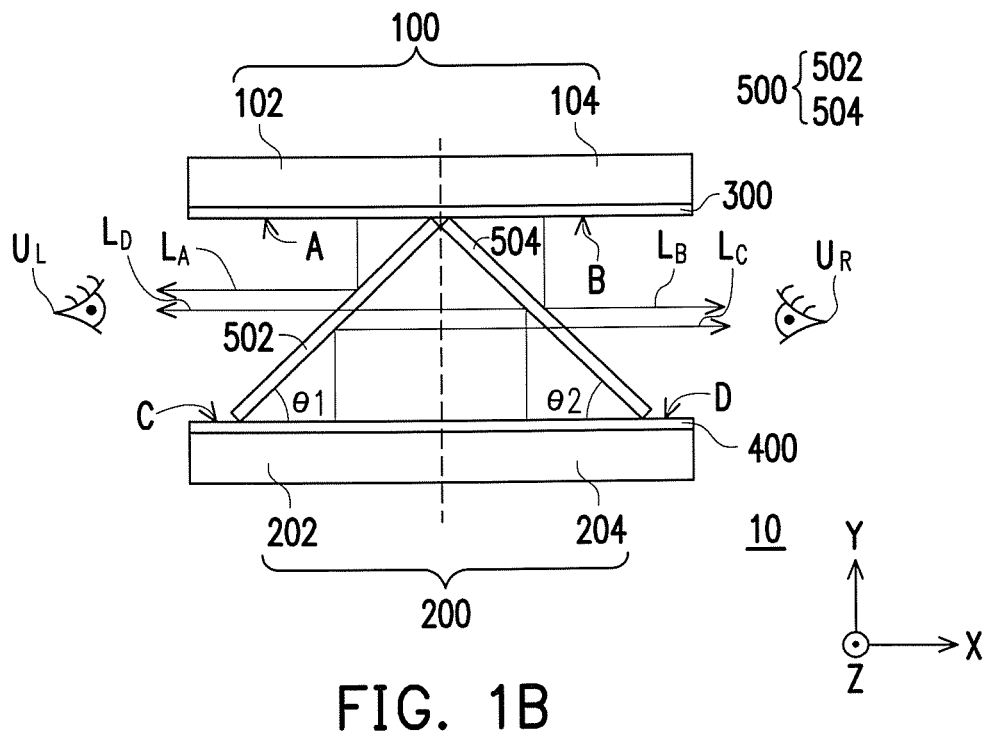
FIG. 1B is a schematic diagram of a light path of the floating image display apparatus of the embodiment of FIG. 1A.

Referring to FIG. 1B, the first display panel 102 emits a first image light beam $L_A$ having information of the first display image A, the second display panel 104 emits a second image light beam $L_B$ having information of the second display image B, the third display panel 202 emits a third image light beam $L_C$ having information of the third display image C, and the fourth display panel 204 emits a fourth image light beam $L_D$ having information of the fourth display image D. After being emitted by the first display panel 102, the first image light beam $L_A$ travels along a reverse direction of the Y-axis first and is being changed to travel along a reverse direction of the X-axis after being reflected by a reflecting surface of the first transflective element 502, so as to be transmitted to a location of a left side user $U_L$. Similarly, after being emitted by the fourth display panel 204, the fourth image light beam $L_D$ travels along a direction of the Y-axis first and is being changed to travel along a reverse direction of the X-axis after being reflected by a reflecting surface of the second transflective element 504, so as to be transmitted through a transmitting surface of the first transflective element 502 to the location of the left side user $U_L$. That is, through the first image light beam $L_A$ and the fourth image light beam $L_D$, the left side user $U_L$ simultaneously sees the first display image A and the fourth display image D floating. It is worth noting that due to a difference in imaging positions, the image seen by the left side user $U_L$ has a multi-layered overlapping effect. More specifically, since the first transflective element 502 is closer to the left side user $U_L$ relative to the second transflective element 504, the first display image A (reflected by the first transflective element 502) viewed by the left side user $U_L$ is closer than the fourth display image D (reflected by the second transflective element 504).

Bearing the above in mind, after being emitted by the second display panel 104, the second image light beam $L_B$ travels along a reverse direction of the Y-axis first and is being changed to travel along a direction of the X-axis after being reflected by the reflecting surface of the second transflective element 504, so as to be transmitted to a location of a right side user $U_R$. Similarly, after being emitted by the third display panel 202, the third image light beam $L_C$ travels along a direction of the Y-axis first and is being changed to travel along a direction of the X-axis after being reflected by the reflecting surface of the first transflective element 502, so as to be transmitted through a transmitting surface of the second transflective element 504 to the location of the right side user $U_R$. That is, through the second image light beam $L_B$ and the third image light beam $L_C$, the right side user $U_R$ simultaneously sees the second display image B and the third display image C floating. It is worth noting that due to a difference in imaging positions, the image seen by the right side user $U_R$ has a multi-layered overlapping effect. More specifically, since the second transflective element 504 is closer to the right side user $U_R$ relative to the first transflective element 502, the second display image B (reflected by the second transflective element 504) viewed by the right side user $U_R$ is closer than the third display image C (reflected by the first transflective element 502). It is worth noting that in the embodiment, the display images A to D of all of the display panels 102, 104, 202 and 204 are all on the XZ-plane. Thus, light exiting directions of the first display module 100 and the second display module 200 both extend along the Y-axis and are parallel to each other.

In the present embodiment, by coordinating a plurality of display panels 102, 104, 202 and 204 and a plurality of transflective elements 502 and 504, the floating image display apparatus 10 allows the left side user $U_L$ and the right side user $U_R$ located at different directions to view different multi-layered images, respectively. In another aspect, by disposing the directional films 300 and 400 on the display modules 100 and 200, the users $U_R$ and $U_L$ are prevented from visual confusion caused by directly seeing the display images on the display panels, thereby enhancing the floating display quality. Furthermore, when the floating image display apparatus 10 is applied to exhibitions, the physical object of the image displayed by the display panel can be placed in a space formed by the first transflective element 502 and the second transflective element 504 for appreciation by users.

Figure 2A:
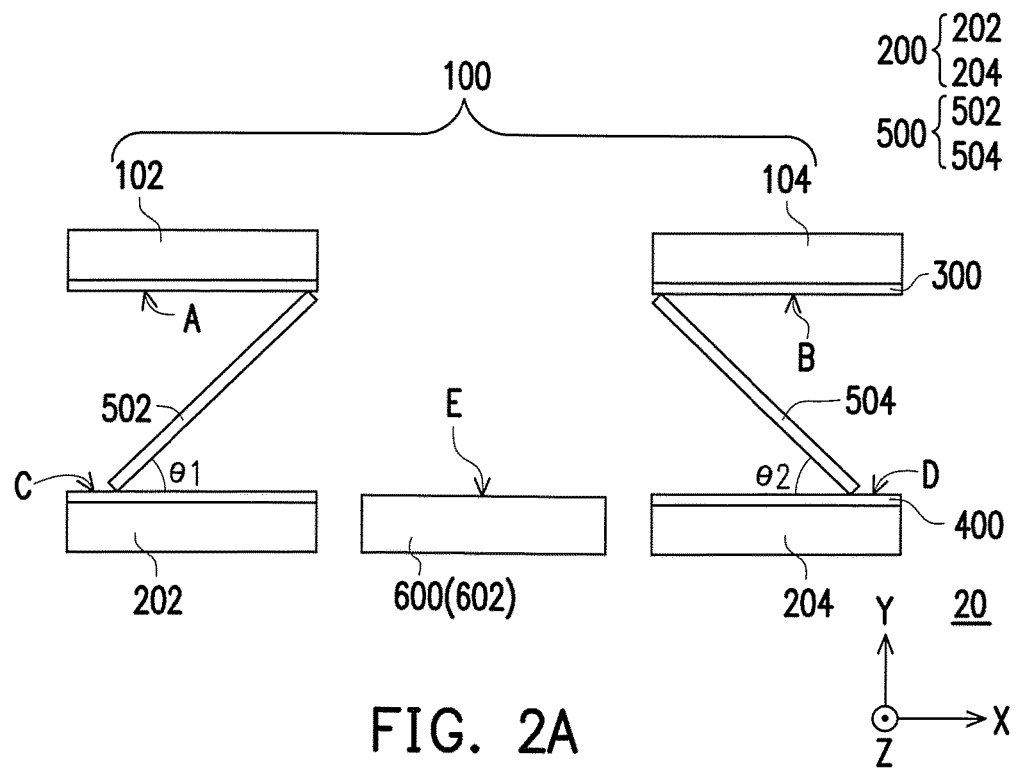
FIG. 2A is a schematic diagram of a side view of a floating image display apparatus according to another embodiment of the invention.
Figure 2B:
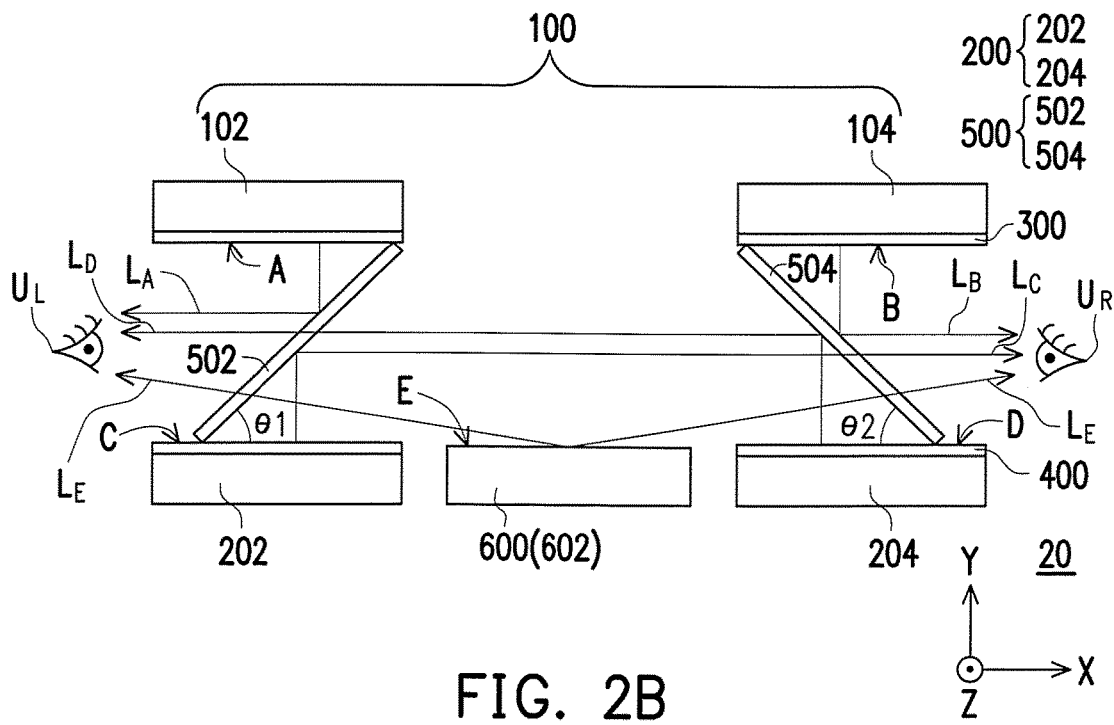
FIG. 2B is a schematic diagram of a light path of the floating image display apparatus of the embodiment of FIG. 2A.

Referring to FIG. 2A, a floating image display apparatus 20 of the present embodiment is similar to the floating image display apparatus 10 in FIG. 1A. Thus, the same elements are indicated with the same reference numerals and are not described again. The differences between the two embodiments of FIG. 2A and FIG. 1A are that in the present embodiment, the first display panel 102 and the second display panel 104 of the first display module 100 are separated from each other, and the third display panel 202 and the fourth display panel 204 of the second display module 200 are separated from each other. Furthermore, the floating image display apparatus 20 of the present embodiment further includes a third display module 600 located on the same plane as the second display module 200. In the present embodiment, the third display module 600 is disposed between the third display panel 202 and the fourth display panel 204, and the third display module 600 includes a fifth display panel 602. The fifth display panel 602 displays a fifth display image E. The light exiting directions of the first display module 100 and the second display module 200 and a light exiting direction of the third display module 600 have an included angle $\alpha 1$, and $0° \leq \alpha 1 \leq 90°$. In the present embodiment, since the fifth display image E of the fifth display panel 602 is also located on the XZ-plane, the light exiting direction thereof, like the first to fourth display panels 102, 104, 202 and 204, all extend along the Y-axis. That is, the present embodiment illustrates the light exiting directions of the first display module 100 and the second display module 200 being parallel to the light exiting direction of the third display module 600 ($\alpha 1=0°$ as an example, but the invention is not limited thereto. As long as $0° \leq \alpha 1 \leq 90°$ is satisfied, the first display module 100, the second display module 200, and the third display module 600 of the invention can also have other ways of configuration. Referring to FIG. 2B, the travelling paths of the first to fourth image light beams $L_A$ to $L_D$ are similar to the embodiment of FIG. 1B, and thus the detailed descriptions are omitted. The fifth display panel 602 emits a fifth image light beam $L_E$ having information of the fifth display image E. The fifth image light beam $L_E$ respectively penetrates the transmitting surfaces of the first transflective element 502 and the second transflective element 504, to simultaneously transmit to the location of the left side user $U_L$ and the right side user $U_R$. More specifically, besides the first display image A and the fourth display image D, the left side user $U_L$ also simultaneously sees the fifth display image E. In another aspect, besides the second display image B and the third display image C, the right side user $U_R$ also simultaneously sees the fifth display image E. Similar to the embodiment of FIG. 1A, due to a difference in imaging positions, the users $U_L$ and $U_R$ in the present embodiment are also able to see multi-layered overlapping images.

In the present embodiment, by coordinating a plurality of display panels 102, 104, 202, 204, and 602 and a plurality of transflective elements 502 and 504, the floating image display apparatus 20 allows the left side user $U_L$ and the right side user $U_R$ located at different directions to view different multi-layered images, respectively. In another aspect, by disposing the directional films 300 and 400 on the display modules 100 and 200, the users $U_R$ and $U_L$ are prevented from visual confusion caused by directly seeing the display images on the display panels, thereby enhancing the floating display quality. Furthermore, the floating image display apparatus 20 of the embodiment has multiple purposes. For example, besides serving as a merchandise display machine at exhibitions, it can also serve purposes of a gaming machine. In other words, the fifth image light beam $L_E$ may serves as an image light beam of a card table. The left side user $U_L$ sees his or her own hand through the first image light beam $L_A$ and the fourth image light beam $L_D$, and the right side user $U_R$ sees another set of hand through the second image light beam $L_B$ and the third image light beam L. Bearing the above in mind, the floating image display apparatus 20 of the present embodiment is able to achieve multiple purposes while providing good floating display quality.

Figure 3A:
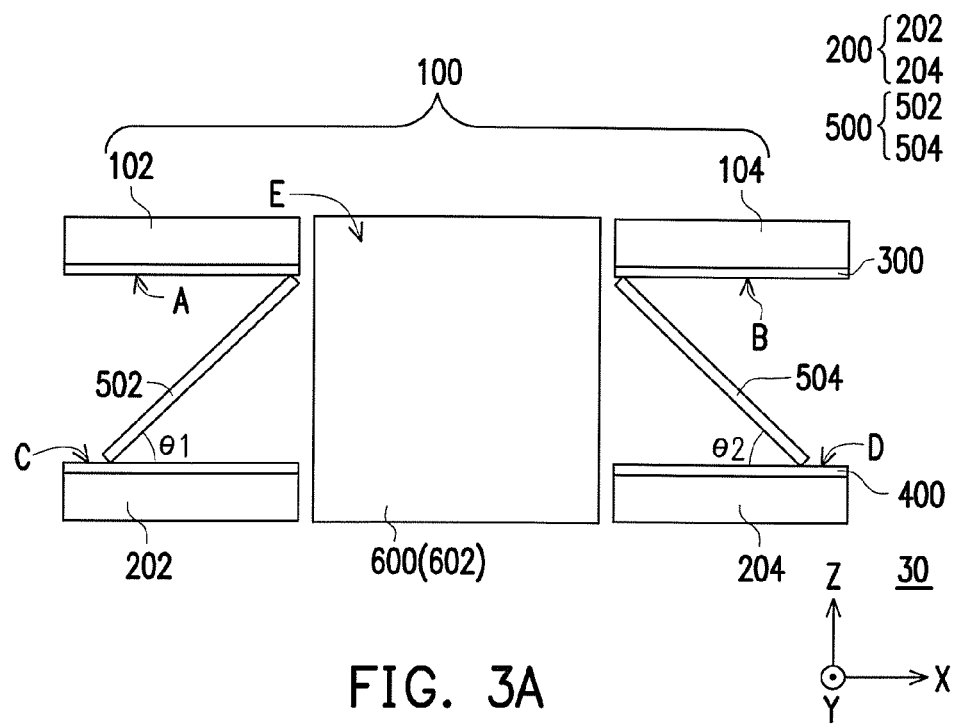
FIG. 3A is a schematic diagram of a top view of a floating image display apparatus according to yet another embodiment of the invention.
Figure 3B:
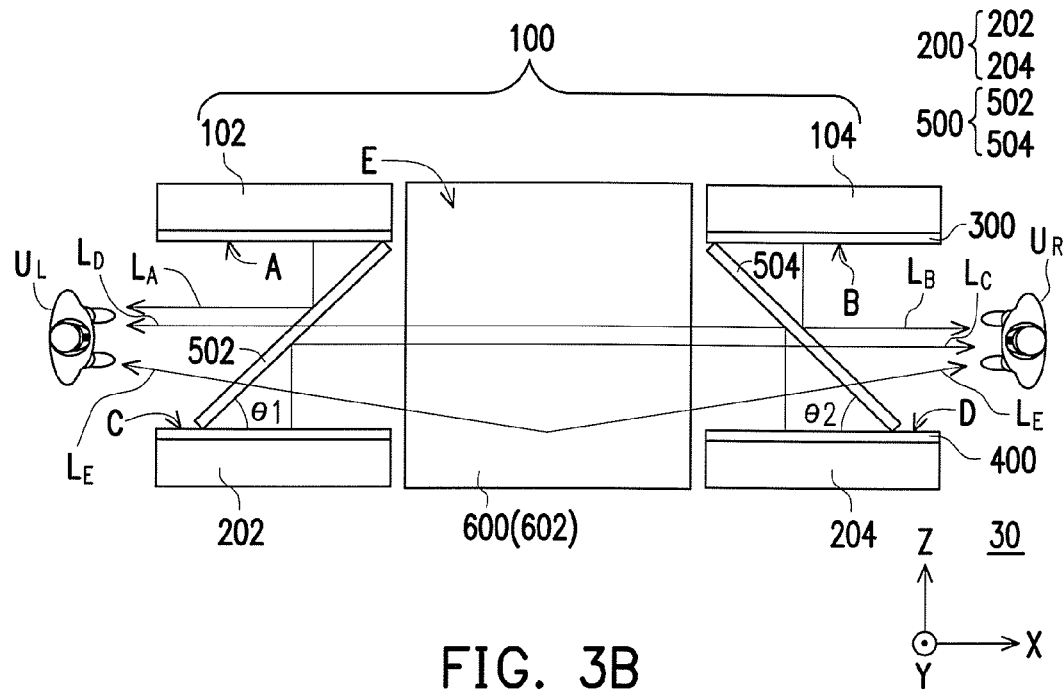
FIG. 3B is a schematic diagram of a light path of the floating image display apparatus of the embodiment of FIG. 3A.

Referring to FIG. 3A and FIG. 3B at the same time, a floating image display apparatus 30 of the present embodiment is similar to the floating image display apparatus 20 in FIG. 2A to FIG. 2B. Thus, the same elements are indicated with the same reference numerals and are not described again. The difference between the two embodiments of FIG. 3A and FIG. 2A is that in the present embodiment, the configuration directions of the first display module 100 and the second display module 200 are different from the embodiment of FIG. 2A. More specifically, in the present embodiment, the display images A to D of the first to fourth display panels 102, 104, 202 and 204 are all on the XY-plane. Thus, the light exiting directions of the first display module 100 and the second display module 200 both extend along the Z-axis and are parallel to each other. On the other hand, the fifth display image E of the fifth display panel 602 is located on the XZ-plane, and thus, the light exiting direction thereof extends along the Y-axis. That is, the present embodiment illustrates the light exiting directions of the first display module 100 and the second display module 200 being parallel to each other, and the light exiting direction of the third display module 600 being respectively perpendicular to the first display module 100 and the second display module 200 ($\alpha 1=90°$) as an example. In other words, in the present embodiment, the first display module 100 and the third display module 600 are perpendicularly disposed, while the second display module 200 and the third display module 600 are also perpendicularly disposed. Similar to the embodiment of FIG. 2B, in the present embodiment, the left side user $U_L$ simultaneously sees multiple layers of the first display image A, the fourth display image D, and the fifth display image E, while the right side user $U_R$ simultaneously sees multiple layers of the second display image B, the third display image C, and the fifth display image E.

In the present embodiment, by coordinating a plurality of display panels 102, 104, 202, 204, and 602 and a plurality of transflective elements 502 and 504, the floating image display apparatus 30 allows the left side user $U_L$ and the right side user $U_R$ located at different directions to view different multi-layered images, respectively. In another aspect, by disposing the directional films 300 and 400 on the display modules 100 and 200, the users $U_R$ and $U_L$ are prevented from visual confusion caused by directly seeing the display images on the display panels, such that the floating image display apparatus can be arbitrarily designed to be placed vertically or horizontally to achieve optimal effects corresponding to different occasions of application.

Figure 4A:
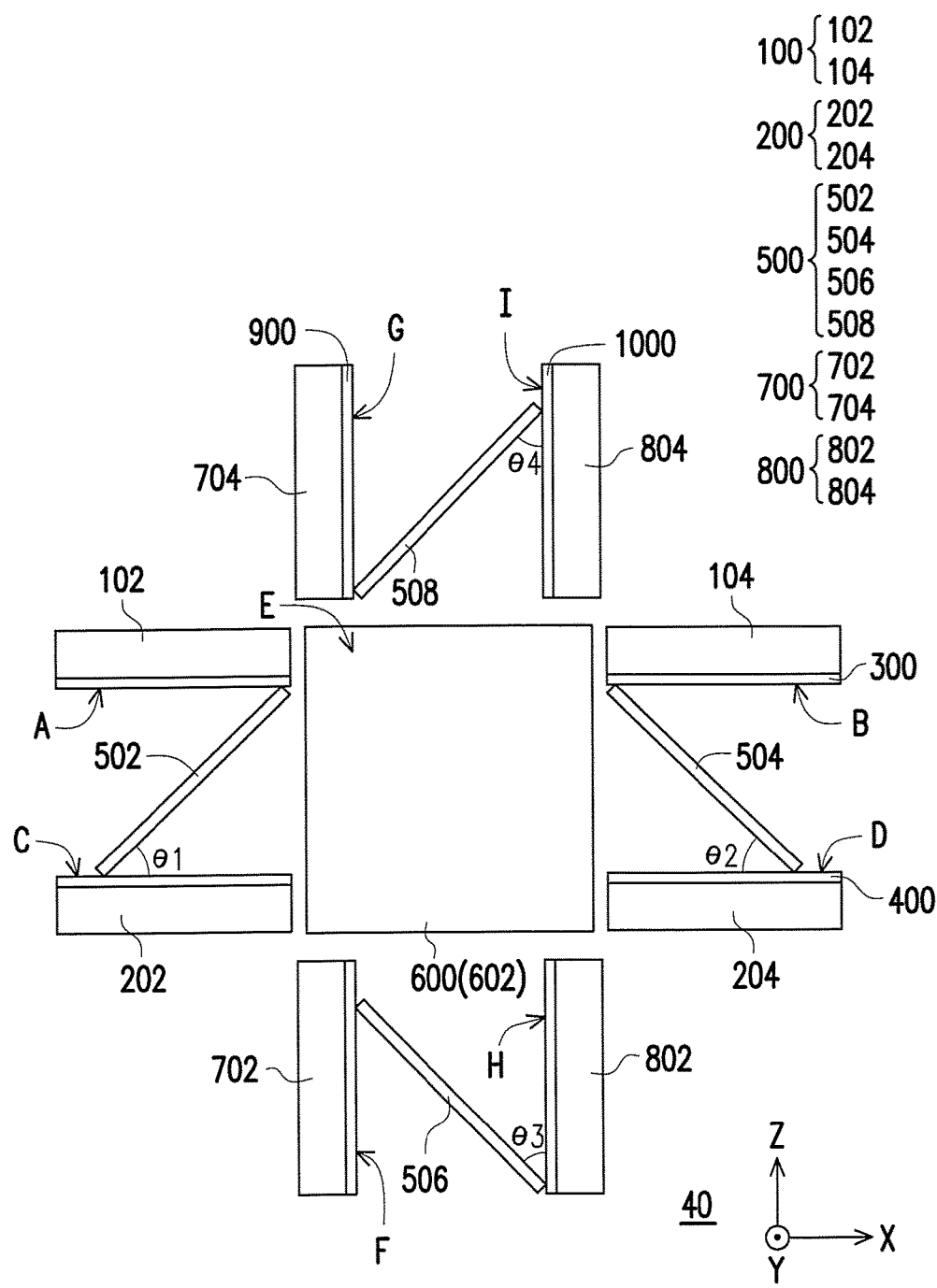
FIG. 4A is a schematic diagram of a top view of a floating image display apparatus according to yet another embodiment of the invention.

Referring to FIG. 4A, a floating image display apparatus 40 of the present embodiment is similar to the floating image display apparatus 30 in FIG. 3A. Thus, the same elements are indicated with the same reference numerals and are not described again. The differences between the two embodiments of FIG. 4A and FIG. 3A are that in the present embodiment, the floating image display apparatus 40 further includes a fourth display module 700, a fifth display module 800, a third directional film 900, and a fourth directional film 1000. Furthermore, the transflective element module 500 further includes a third transflective element 506 and a fourth transflective element 508. The fourth display module 700 includes a sixth display panel 702 and a seventh display panel 704, and the fifth display module 800 includes a eighth display panel 802 and a ninth display panel 804. The sixth display panel 702 displays a sixth display image F, and the seventh display panel 704 displays a seventh display image G. In another aspect, the eighth display panel 802 displays an eighth display image H, and the ninth display panel 804 displays a ninth display image I. A light exiting direction of the fourth display module 700 and the light exiting direction of the third display module 600 have an included angle $\alpha 2$, and $0°\leq\alpha 2\leq 90°$. In another aspect, a light exiting direction of the fifth display module 800 and the light exiting direction of the third display module 600 have an included angle $\alpha 3$, and $0°\leq\alpha 3\leq 90°$. In the present embodiment, the display images A to D of the first to fourth display panels 102, 104, 202 and 204 are all on the XY-plane. Thus, the light exiting directions of the first display module 100 and the second display module 200 both extend along the Z-axis and are parallel to each other. In another aspect, the fifth display image E of the fifth display panel 602 is located on the XZ-plane, and thus, the light exiting direction thereof extends along the Y-axis. Furthermore, the display images F to I of the sixth to ninth display panels 702, 704, 802 and 804 are all on the YZ-plane. Thus, the light exiting directions of the fourth display module 700 and the fifth display module 800 both extend along the X-axis and are parallel to each other. That is, the light exiting directions of the fourth display module 700 and the fifth display module 800 are respectively perpendicular to the light exiting directions of the first display module 100, the second display module 200, and the third display module 600 ($\alpha 2=90°$, $\alpha 3=90°$). In other words, in the present embodiment, the fourth display module 700 and the fifth display module 800 are respectively disposed perpendicular to the first display module 100, the second display module 200, and the third display module 600. However, the invention is not limited thereto. In other embodiments, the fourth display module 700 and the fifth display module 800 can also be disposed perpendicular to only the first display module 100 and the second display module 200, while disposed parallel to the third display module 600. That is, as long as 0°≤α2≤90° and 0°≤α3≤90° are satisfied, the third display module 600, the fourth display module 700, and the fifth display module 800 of the invention can also have other ways of configuration.

Similar to the embodiment of FIG. 3A, the third directional film 900 is disposed on the fourth display module 700 and is located between the fourth display module 700 and the fifth display module 800. The fourth directional film 1000 is disposed on the fifth display module 800 and is also located between the fourth display module 700 and the fifth display module 800. In other words, the third directional film 900 and the fourth directional film 1000 are disposed on different display modules. The third transflective element 506 is disposed corresponding to the sixth display panel 702 and the eighth display panel 802, and the fourth transflective element 508 is disposed corresponding to the seventh display panel 704 and the ninth display panel 804. More specifically, the third transflective element 506 is located between the sixth display panel 702 and the eighth display panel 802 and is in direct contact with the sixth display panel 702 and the eighth display panel 802. However, in other embodiments, the third transflective element 506 may not be in direct contact with the sixth display panel 702 or the eighth display panel 802. The third transflective element 506 and the sixth display panel 702 of the fourth display module 700 and the eighth display panel 802 of the fifth display module 800 form a third included angle θ3, and 0°<θ3<90°. In other words, the third transflective element 506 is inclinedly placed between the sixth display panel 702 and the eighth display panel 802. Similarly, the fourth transflective element 508 is located between the seventh display panel 704 and the ninth display panel 804 and is in direct contact with the seventh display panel 704 and the ninth display panel 804. However, in other embodiments, the fourth transflective element 508 may not be in direct contact with the seventh display panel 704 or the ninth display panel 804. The fourth transflective element 508 and the ninth display panel 804 of the fifth display module 800 form a fourth included angle θ4, and 0°<θ4<90°. In other words, the fourth transflective element 508 is inclinedly placed between the seventh display panel 704 and the ninth display panel 804.

Figure 4B:
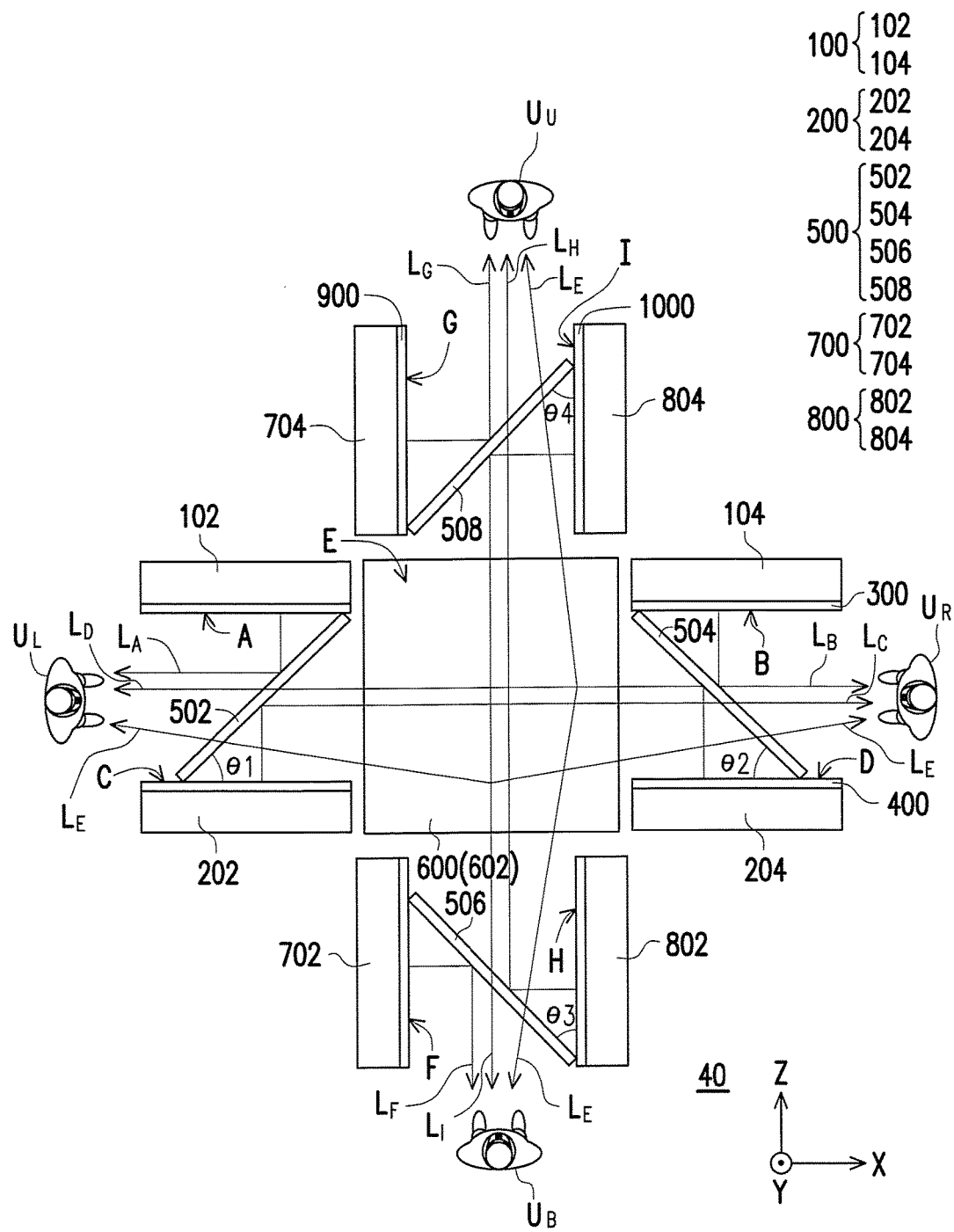
FIG. 4B is a schematic diagram of a light path of the floating image display apparatus of the embodiment of FIG. 4A.

Referring to FIG. 4B, the sixth display panel 702 emits a sixth image light beam $L_F$ having information of the sixth display image F, the seventh display panel 704 emits a seventh image light beam $L_G$ having information of the seventh display image G, the eighth display panel 802 emits an eighth image light beam $L_H$ having information of the eighth display image H, and the ninth display panel 804 emits a ninth image light beam $L_I$ having information of the ninth display image I. After being emitted by the sixth display panel 702, the sixth image light beam $L_F$ travels along a direction of the X-axis first and is being changed to travel along a reverse direction of the Z-axis after being reflected by a reflecting surface of the third transflective element 506, so as to be transmitted to a location of a lower user $U_B$. Similarly, after being emitted by the ninth display panel 804, the ninth image light beam $L_I$ travels along a reverse direction of the X-axis first and is being changed to travel along a reverse direction of the Z-axis after being reflected by a reflecting surface of the fourth transflective element 508, so as to be transmitted through a transmitting surface of the third transflective element 506 to the location of the lower user $U_B$. In another aspect, the fifth image light beam $L_E$ penetrates the transmitting surface of the third transflective element 506 to transmit to the lower user $U_B$. That is, through the fifth image light beam $L_E$, the sixth image light beam $L_F$, and the ninth image light beam $L_I$, the lower user $U_B$ simultaneously sees the fifth display image E, the sixth display image F, and the ninth display image I floating.

Bearing the above in mind, after being emitted by the seventh display panel 704, the seventh image light beam $L_G$ travels along a direction of the X-axis first and is being changed to travel along a direction of the Z-axis after being reflected by the reflecting surface of the fourth transflective element 508, so as to be transmitted to a location of an upper user $U_U$. Similarly, after being emitted by the eighth display panel 802, the eighth image light beam $L_H$ travels along a reverse direction of the X-axis first and is being changed to travel along a direction of the Z-axis after being reflected by the reflecting surface of the third transflective element 506, so as to be transmitted through a transmitting surface of the fourth transflective element 508 to the location of the upper user $U_U$. In another aspect, the fifth image light beam $L_E$ penetrates the transmitting surface of the fourth transflective element 508 to transmit to the upper user $U_U$. That is, through the fifth image light beam $L_E$, the seventh image light beam $L_G$, and the eighth image light beam $L_H$, the upper user $U_U$ simultaneously sees the fifth display image E, the seventh display image G, and the eighth display image H floating. Similar to other embodiments, the images seen by the lower user $U_B$ and the upper user $U_U$ are multi-layered floating images.

In the present embodiment, by coordinating a plurality of display panels 102, 104, 202, 204, 602, 702, 704, 802 and 804 and a plurality of transflective elements 502, 504, 506, and 508, the floating image display apparatus 40 allows the left side user $U_L$, the right side user $U_R$, the upper user $U_U$, and the lower user $U_B$ located at different directions to view different multi-layered images, respectively. In another aspect, by disposing the directional films 300, 400, 900, and 1000 on the display modules 100, 200, 700, and 800, the users $U_R$, $U_L$, $U_U$, and $U_B$ are prevented from visual confusion caused by directly seeing the display images on the display panels, such that the floating image display apparatus can be arbitrarily designed to be placed vertically or horizontally to achieve optimal effects corresponding to different occasions of application. Furthermore, the floating image display apparatus 40 of the present embodiment has multiple purposes. For example, besides serving as a merchandise display machine at exhibitions, it can also serve purposes of a mahjong machine. In other words, each of the users $U_R$, $U_L$, $U_U$, and $U_B$ sees his or her own set of hand through different image light beams. Bearing the above in mind, the floating image display apparatus 40 of the present embodiment is able to achieve multiple purposes while providing good floating display quality.

In summary of the above, by coordinating the plurality of display panels and the plurality of transflective elements, the floating image display apparatus of the invention presents multi-directional images, such that the users may view different image from different viewing angles. Furthermore, since the transmission path of the image light beam of each of the display panels is different, the images viewed by the users may present a multi-layered effect. In another aspect, by disposing the directional films on the display modules, the issue of visual confusion caused by the users directly seeing the display image on the display panels in specific directions is reduced, such that the floating image display apparatus can be arbitrarily designed to be placed vertically or horizontally to achieve optimal effects corresponding to different occasions of application.

What is claimed is:

1. A floating image display apparatus, comprising:
a plurality of display modules, comprising:
- a first display module, comprising a first display panel and a second display panel; and
- a second display module, located apart from and facing the first display module, wherein the second display module comprises a third display panel and a fourth display panel, the third display panel is disposed facing the first display panel, and the fourth display panel is disposed facing the second display panel;
- a first directional film, disposed on the first display module on the side facing the second display module; and
- at least one transflective element, located between the first display module and the second display module, and one of the at least one transflective element forms with the second display module an included angle $\theta 1$, wherein the first display panel emits a first image light beam through the first directional film in the direction of the second display module, the fourth display panel emits a second image light beam that is reflected by a surface towards said one of the at least one transflective element in the direction of a location of a user, the first image light beam is reflected by said one of the at least one transflective element to a location of the user, and the second image light beam is transmitted through said one of the at least one transflective element to the location of the user.

2. The floating image display apparatus according to claim 1, wherein the first display panel and the second display panel display different images, and the third display panel and the fourth display panel display different images.

3. The floating image display apparatus according to claim 2, wherein the floating image display apparatus further comprises a second directional film, disposed on the second display module and located between the second display module and the first display module.

4. The floating image display apparatus according to claim 3, wherein the first display panel and the second display panel are formed integrally, and the third display panel and the fourth display panel are formed integrally.

5. The floating image display apparatus according to claim 3, wherein the first display panel and the second display panel are separated from each other, and the third display panel and the fourth display panel are separated from each other.

6. The floating image display apparatus according to claim 5, wherein the plurality of display modules further comprise a third display module, disposed between the third display panel and the fourth display panel, and the third display module comprises a fifth display panel.

7. The floating image display apparatus according to claim 6, wherein light exiting directions of the first display module and the second display module and a light exiting direction of the third display module have an included angle $\alpha 1$, and $0°\leq \alpha 1 \leq 90°$.

8. The floating image display apparatus according to claim 7, wherein the plurality of display modules further comprise:
- a fourth display module, comprising a sixth display panel and a seventh display panel, a light exiting direction of the fourth display module and the light exiting direction of the third display module have an included angle $\alpha 2$, and $0°\leq \alpha 2 \leq 90°$;
- a fifth display module, located on an opposite side to the fourth display module, wherein the fifth display module comprises an eighth display panel and a ninth display panel, the eighth display panel is disposed corresponding to the sixth display panel, the ninth display panel is disposed corresponding to the seventh display panel, and a light exiting direction of the fifth display module and the light exiting direction of the third display module have an included angle $\alpha 3$, and $0°\leq \alpha 3 \leq 90°$;
- a third directional film, disposed on the fourth display module and located between the fourth display module and the fifth display module; and
- a fourth directional film, disposed on the fifth display module and located between the fifth display module and the fourth display module, and the at least one transflective element is located between the fourth display module and the fifth display module.

9. The floating image display apparatus according to claim 1, wherein said one of the at least one transflective element is a planar structure.

10. The floating image display apparatus according to claim 1, wherein said one of the at least one transflective element is a curved structure.

* * * * *